(12) United States Patent
Edland

(10) Patent No.: US 7,059,025 B2
(45) Date of Patent: Jun. 13, 2006

(54) FASTENER

(75) Inventor: David W. Edland, Chippewa Falls, WI (US)

(73) Assignee: Illinois Tool Work, Inc., Glenview, IL (US)

( * ) Notice: Subject to any disclaimer, the term of this patent is extended or adjusted under 35 U.S.C. 154(b) by 0 days.

(21) Appl. No.: 11/042,944

(22) Filed: Jan. 25, 2005

(65) Prior Publication Data

US 2005/0241121 A1    Nov. 3, 2005

Related U.S. Application Data

(60) Provisional application No. 60/566,236, filed on Apr. 29, 2004.

(51) Int. Cl.
A44B 21/00    (2006.01)

(52) U.S. Cl. .............................. 24/458; 292/257; 24/498

(58) Field of Classification Search ................... 24/458, 24/457, 297, 498, 544, DIG. 31; 292/57.113, 292/247; 403/408.1, 353, 13, 14, 282, 331
See application file for complete search history.

(56) References Cited

U.S. PATENT DOCUMENTS

| | | | |
|---|---|---|---|
| 1,229,851 A | 6/1917 | Abercrombie | |
| 1,281,000 A | 10/1918 | Hayter | |
| 2,185,782 A | 1/1940 | Brittin | |
| 3,402,958 A * | 9/1968 | Barry | 292/62 |
| 4,367,569 A * | 1/1983 | Harmon | 24/453 |
| 5,322,402 A * | 6/1994 | Inoue | 411/510 |
| 5,396,746 A | 3/1995 | Whitmer | 52/208 |
| 5,580,204 A | 12/1996 | Hultman | 411/509 |
| 5,590,921 A * | 1/1997 | Holtman et al. | 292/257 |
| 5,653,496 A | 8/1997 | Mori et al. | 296/189 |
| 5,800,022 A | 9/1998 | Del Rosario | 301/5.3 |
| 6,209,175 B1 | 4/2001 | Gershenson | 24/297 |
| 6,261,042 B1 | 7/2001 | Pratt | 411/551 |
| 6,336,672 B1 | 1/2002 | Beaver | 296/97.9 |
| 6,408,659 B1 * | 6/2002 | Chang | 70/19 |
| 6,659,513 B1 * | 12/2003 | Ramsauer | 292/66 |

* cited by examiner

*Primary Examiner*—Robert J. Sandy
*Assistant Examiner*—Marcus Menezes
(74) *Attorney, Agent, or Firm*—Mark W. Croll; Paul F. Donovan

(57) ABSTRACT

A fastener connects a first object to a second object and includes an anchor securable to the second object and configured to have a portion thereof pass through a hole in the first object. A latch is connectable to the anchor on a side of the first object opposite the second object. The latch is connectable without tools, and provides clamping force for securing the objects to each other.

20 Claims, 3 Drawing Sheets

FASTENER

CROSS-REFERENCE TO RELATED APPLICATIONS

The present regular United States Patent Application claims the benefits of U.S. Provisional Application Ser. No. 60/566,236 filed on Apr. 29, 2004.

FIELD OF THE INVENTION

The present invention relates generally to fasteners for detachably, yet securely connecting one object to another object, and, more particularly, to fasteners used to attach assemblies to frames, such as door module assemblies to motor vehicle door panels.

BACKGROUND OF THE INVENTION

Different types of fastener configurations are used to connect subassemblies to each other and to frames of machines in which they operate. In the automotive industry, for example, it is known to assemble various subassemblies and thereafter to install the subassemblies in the automobile. It is known to assemble a door module to include the lock and handle mechanisms, and thereafter to fasten the door module to an inner sheet metal component using metal bolts and weld nuts. Attachment may require the use of ten or twelve such fasteners at selected locations within the module to securely affix the module in the proper location.

The process of connecting door modules to the door frame using metal bolts and weld nuts is both time consuming and expensive. One or more hand or power tools need to be available, and must be used efficiently and properly, including the proper engagement of the tool with the fastener. Even a slight delay while engaging the tool with the fastener or while operating the tool to tighten the fastener projected over the large number of fasteners used can substantially increase the assembly time required. Conversely, a relatively small change in efficiency per fastener projected over the large number of fasteners used increases the production efficiency significantly.

Fasteners for securing door modules or other subassemblies in place must be strong and secure, yet desirably are detachable so that the subassembly can be removed for servicing or repair. Bolt-like fasteners can be difficult to disengage after having remained in position for an extended period of time. Threads of threaded fasteners can become distorted, and corrosion can cause the fastener to be difficult to operate. Once detached, many fasteners are not suitable for re-use, increasing the expensive for servicing and repair.

What is needed is a fastener that is strong and secure, is reusable and provides sufficient clamping force for securing relatively large objects in place. Preferably, the fastener can be operated without the use of tools.

SUMMARY OF THE INVENTION

The present invention provides a fastener having an anchor that can be pre-assembled to one object, and a latch attachable to the anchor to secure a second object to the first object. The latch can be engaged without the use of tools, and provides a clamping force sufficient to secure objects together.

In one aspect thereof, the present invention provides a fastener for securing a first object having a hole therethrough to a second object. The fastener has an anchor for attachment to the second object. The anchor includes a base configured for attachment to the second object, a post projecting from the base and an enlargement at the distal end of the post. The post is configured for inserting in the hole of the first object. A latch is configured for selective engagement with and disengagement from the base. The latch includes a body having an end face and first and second adjacent faces extending away from opposite edges of the end face. The body defines a cavity configured for receiving and holding the enlargement. The cavity extends from the first adjacent face to the second adjacent face and has an opening in the first adjacent face sufficiently large for the enlargement to enter the cavity. A restriction in the cavity prevents the enlargement from passing there past to the second adjacent face. A channel is open to the cavity, to the end face and to the first and second adjacent faces. The channel is of sufficient width for the post to pass therethrough and of insufficient width at least adjacent the cavity for the enlargement to enter the channel.

In another aspect thereof, the present invention provides a fastener for securing a first object having a hole therethrough to a second object. The fastener has an anchor connectable to the second object. The anchor includes a base configured for attachment to the second object, a post projecting from the base; and an enlargement on a distal end of the post. The enlargement is configured to pass through the hole. A latch includes a body having an end face and first and second faces adjacent opposite edges of the end face. A generally keyhole shaped slot extends into the body between the first face and the second face, the slot including a cavity having an opening in the first face of sufficient size for the enlargement to enter therethrough. The cavity has a restriction therein between the first and second faces for preventing the enlargement from passing there past. The slot includes a channel open to the cavity and extending through the body between the first face and the second face, and between the cavity and the end face. The channel is of sufficient width for the post to move therethrough and is sufficiently narrow adjacent the cavity to prevent the enlargement from entering the channel.

In a still further aspect thereof, the present invention provides a fastener for securing a first object having a hole therethrough to a second object. The fastener has an anchor connectable to the second object. The anchor includes a base configured for attachment to the second object, a post projecting from the base; and an enlargement on a distal end of the post. The enlargement is configured to pass through the hole. A latch includes a body having a slot for disengageable receiving and engaging the post and the enlargement in a first position. The latch is configured for tilting to a second position to lock the post and enlargement into the latch and to compress the first and second objects toward each other.

Other features and advantages of the invention will become apparent to those skilled in the art upon review of the following detailed description, claims and drawings in which like numerals are used to designate like features.

Figure 1:
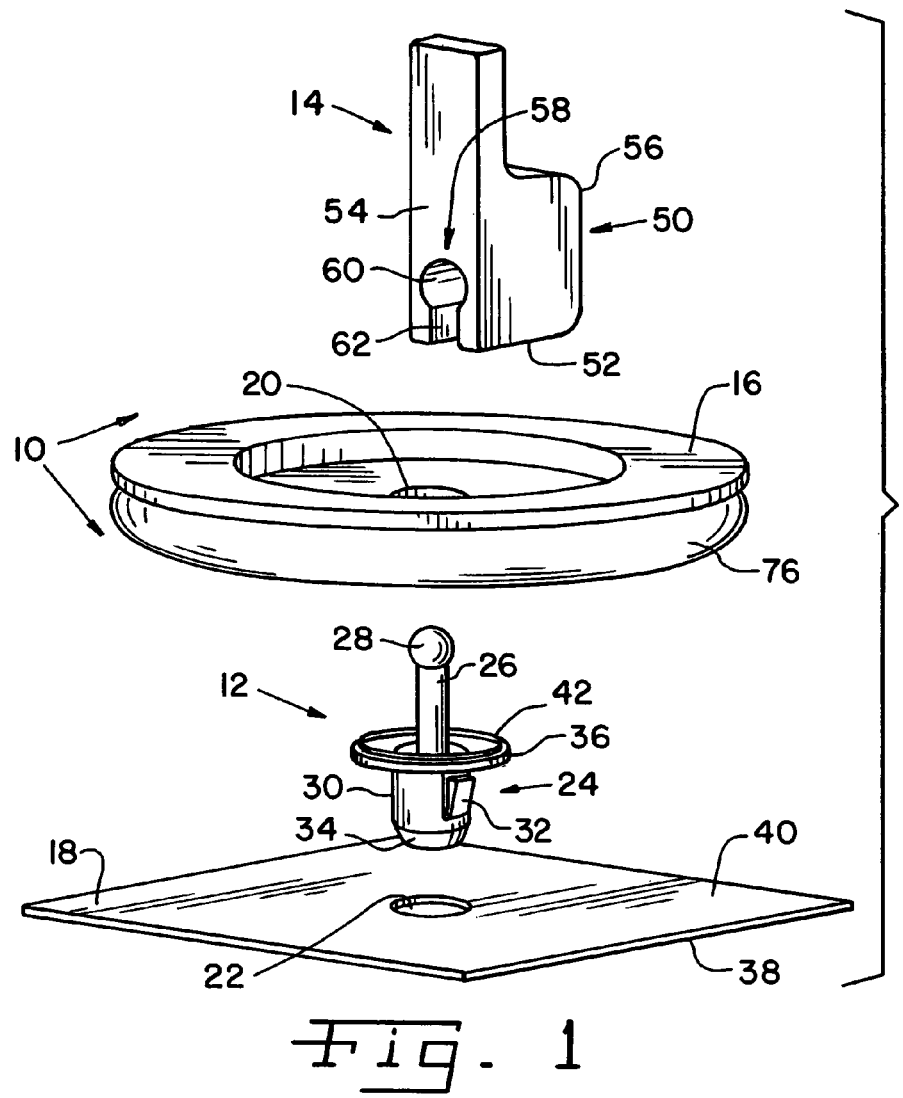
FIG. 1 is an exploded view of a fastener in accordance with the present invention, and two objects to be secured to each other.

Before the embodiments of the invention are explained in detail, it is to be understood that the invention is not limited in its application to the details of construction and the arrangements of the components set forth in the following description or illustrated in the drawings. The invention is capable of other embodiments and of being practiced or being carried out in various ways. Also, it is understood that the phraseology and terminology used herein are for the purpose of description and should not be regarded as limiting. The use herein of "including", "comprising" and variations thereof is meant to encompass the items listed thereafter and equivalents thereof, as well as additional items and equivalents thereof.

DETAILED DESCRIPTION OF THE PREFERRED EMBODIMENT

Referring now more specifically to the drawings and to FIG. 1 in particular, numeral 10 designates a fastener in accordance with the present invention. Fastener 10 includes an anchor 12 and a latch 14. Fastener 10 is used to secure a first object 16 to a second object 18.

First object 16 and second object 18 are depicted in the drawings as plate-like structures for purposes of simplicity. However, it should be understood that first and second objects 16 and 18 can be of a variety of different forms and constructions. For example, first object 16 can be a door module in an automobile, and may include door handle and lock mechanisms and the like (not shown). Second object 18 can be a sheet panel in the door, or frame-like structure of the door. Other examples of structures for which fastener 10 can be used include, but are not limited to fuse boxes and covers, air filter housings and covers, jack stowage compartments and covers, etc. It should be further understood that depending on the size, shape and construction of first and second objects 16 and 18, a plurality of fasteners 10 can be used to secure first object 16 to second object 18. For example, eight to twelve fasteners 10 may be required around a door module provided as first object 16, to secure the module to a door panel provided as second object 18. Objects 16 and 18 can be of a variety of materials including metals and plastic. Objects 16 and 18 define therein holes 20, 22 respectively, one set of holes 20, 22 for each fastener 10 being used.

Anchor 12 and latch 14 also can be of a variety of materials, such as metal or plastics. For example, acetal is a suitable material for anchor 12 and for latch 14. Forming anchor 12 and latch 14 can be by molding or other suitable and efficient forming techniques, as those skilled in the art will understand readily.

Anchor 12 includes a base 24, a post 26 extending axially from base 24 and an enlargement 28 on a distal end of post 26, opposite base 24. Anchor 12 including base 24, post 26 and enlargement 28 can be formed as a monolithic body of cast material, as those skilled in the art will readily understand.

Base 24 is configured for attaching anchor 12 to second object 18, and in the embodiment illustrated is configured specifically for attaching anchor 12 in hole 22 of second object 18. Base 24 thereby includes a central elongation 30 and one or more lateral members 32 extending outwardly from elongation 30. Elongation 30 can be a substantially cylindrical hollow body, with lateral members 32 being deflectable portions thereof. In the embodiment illustrated, two lateral members 32 are shown substantially diametrically opposed to each other on elongation 30. However, those skilled in the art will understand that one, or more than two lateral members also can be used, and lateral members 32 may take other shapes and forms than that shown. Lateral members 32 define an outer perimeter larger in diameter than hole 22 of second object 18. Lateral members 32 deflect radially inwardly toward and/or into elongation 30, as base 24 is inserted in hole 22. Lateral members 32 spring outwardly as the lateral members 32 are pushed completely through hole 22 of second object 18. Elongation 30 may include a tapered end 34 to facilitate insertion of base 24 in hole 22 by allowing easy alignment thereof in hole 22.

Figure 8:
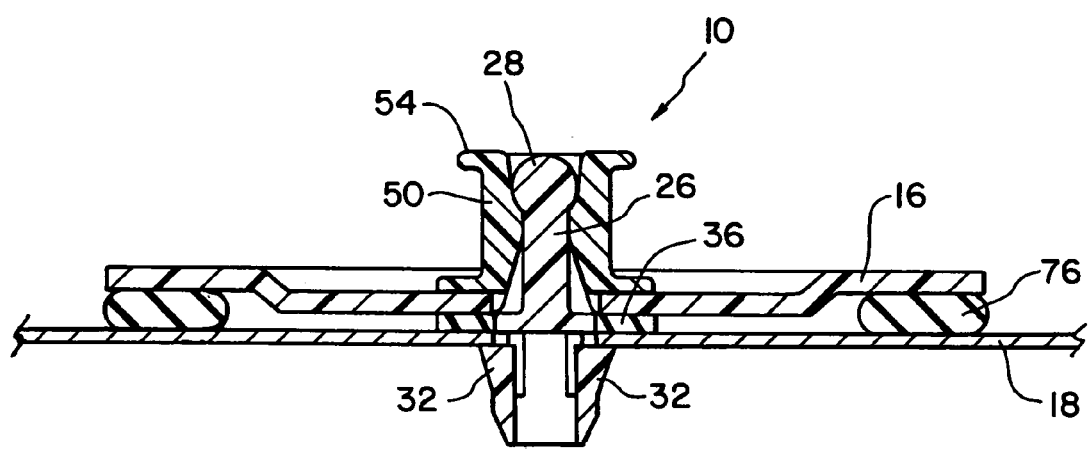
FIG. 8 is a cross-sectional view of the fastener in an assembled condition.

A circumferential flange 36 is provided at the transition between base 24 and post 26, and may be formed also monolithically with base 24 and post 26. Flange 36 is of greater diameter than hole 22 so that flange 36 cannot pass through hole 22. Flange 36 and ends of lateral members 32 are spaced from each other by a distance substantially similar to a thickness dimension of second object 18 immediately adjacent hole 22. Second object 18 is securely held in the space between lateral members 32 and flange 36 when base 24 is fully inserted in hole 22, with lateral member 32 and flange 36 confronting opposite faces 38, 40 of second object 18, as shown in FIG. 8.

Anchor 12 can be pre-installed in second object 18 at any time convenient to the assembly process. Installation of anchor 12 can occur when first object 16 is to be attached thereto, or can be performed at any time prior to the time at which first object 16 is to be connected thereto. When first and second objects 16 and 18 are separately assembled and later brought together, anchor 12 can be installed in second object 18 while other components of second object 18 are being installed, during a phase of the assembly of second object 18 when the installation of anchor 12 is convenient and easy.

Flange 36 can be provided with a resilient layer 42 thereon against which first object 16 is compressed when latch 10 is connected. Resilient layer 42 can be made of material sufficient to provide a weather-tight seal when such is desirable or simply to facilitate secure mounting of first object 16 on anchor 12. In one embodiment, resilient layer 42 is an elastomer formed as an over-molding on anchor 12. Discrete washers also can be used. Santoprene is a suitable material for layer 42 when a seal resistant to moisture intrusion is desired.

Post 26 and enlargement 28 are configured to pass through hole 20 of first object 16 so that first object 16 can be inserted on anchor 12 to rest against flange 36 and/or resilient layer 42. It is noted that in an alternative arrangement, flange 36 can be smaller than hole 20 so as to enable the user to install anchor 12 after first object 16 is positioned against second object 18. This arrangement may be desirable when a seal or more secure mounting assembly is not required.

Figure 2:
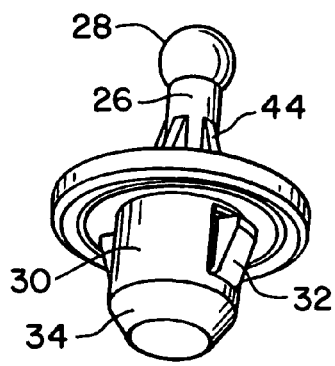
FIG. 2 is a perspective view of an embodiment for an anchor for a fastener in accordance with the present invention.
Figure 3:
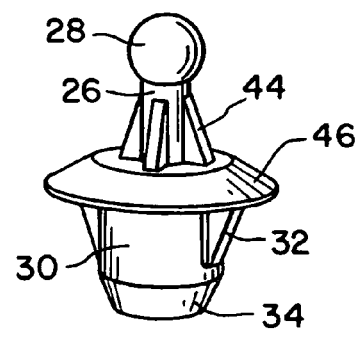
FIG. 3 is a perspective view of another embodiment of the anchor.
Figure 4:
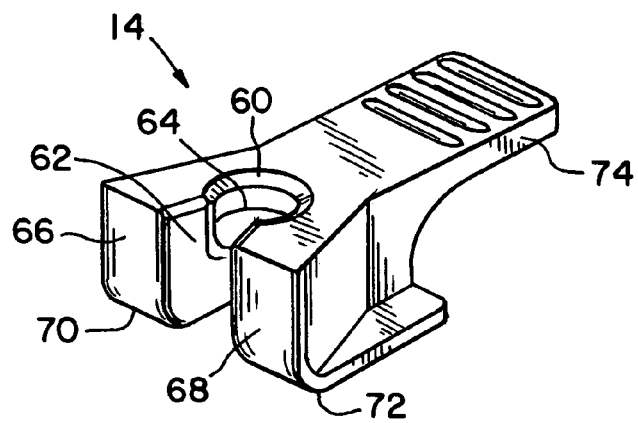
FIG. 4 is a perspective view of a latch for a fastener in accordance with the present invention.
Figure 5:
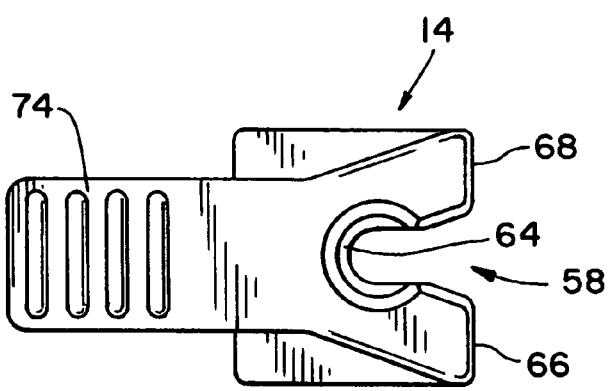
FIG. 5 is a top view of the latch shown in FIG. 4.
Figure 6:
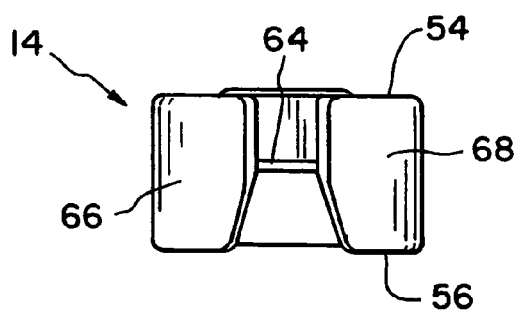
FIG. 6 is an end view of the latch.

FIGS. 2 and 3 illustrate further embodiments of anchor 12. Post 12 is provided with one or more angular wing 44 that will center and/or wedge within hole 20 of first object 16. A domed cap 46 can be used in place of the flatter flange 36 illustrated in FIG. 1. Other variations are possible, to accommodate desired design objectives for strength, rigidity, sealing and the like.

Latch 14 includes a main body 50 having an end face 52 and first and second adjacent faces 54, 56, respectively, extending from generally opposite edges of end face 52. A keyhole-shaped slot 58 extends through body 50 from first face 54 to second face 56. Keyhole-shaped slot 58 includes a cavity 60 and a channel 62, each opening in first face 54. Cavity 60 is of sufficient size for enlargement 28 to enter therein, and channel 62 is of sufficient size for post 26 to enter therein. A restriction 64 is provided in cavity 60, to prevent enlargement 28 from passing completely through body 12 from first face 54 thereof to second face 56 thereof. Channel 62 extends between cavity 60 and end face 52. Channel 62 further extends completely through body 50 from first face 54 thereof to second face 56 thereof. Channel 62 is of sufficient width through out to allow post 26 to move therethrough. Channel 62t is sufficiently narrow adjacent cavity 60 that enlargement 28 cannot enter channel 62.

Channel 62 substantially bisects end face 52 into first and second sides 66, 68. Curved transitions 70, 72, respectively, are provided between first and second sides 66, 68 and the adjacent portions of second face 56.

A thickness dimension of body 50 between first adjacent face 54 and second adjacent face 56 is greater nearest end face 52 and becomes less farther from end face 52. Thus, body 52 gets progressively narrower in the dimension between first face 54 and second face 56 further from end face 52.

A handle 74 projects from body 50 substantially opposite end face 52, substantially along first adjacent face 54.

In the use of fastener 10, anchor 12 is secured to second object 18 by inserting elongation 30 into hole 22 of second object 18, with anchor 20 being forced therein until lateral members 32 are pushed through hole 22. Lateral members 32 deflect inwardly to allow insertion of base 24 in hole 22, and spring outwardly when pushed past face 38.

First object 16 is positioned to slide hole 20 over enlargement 28 and around and along post 26. First object 16 is pushed along post 26 until first object 16 rests against flange 36 and/or resilient layer 42.

Figure 7:
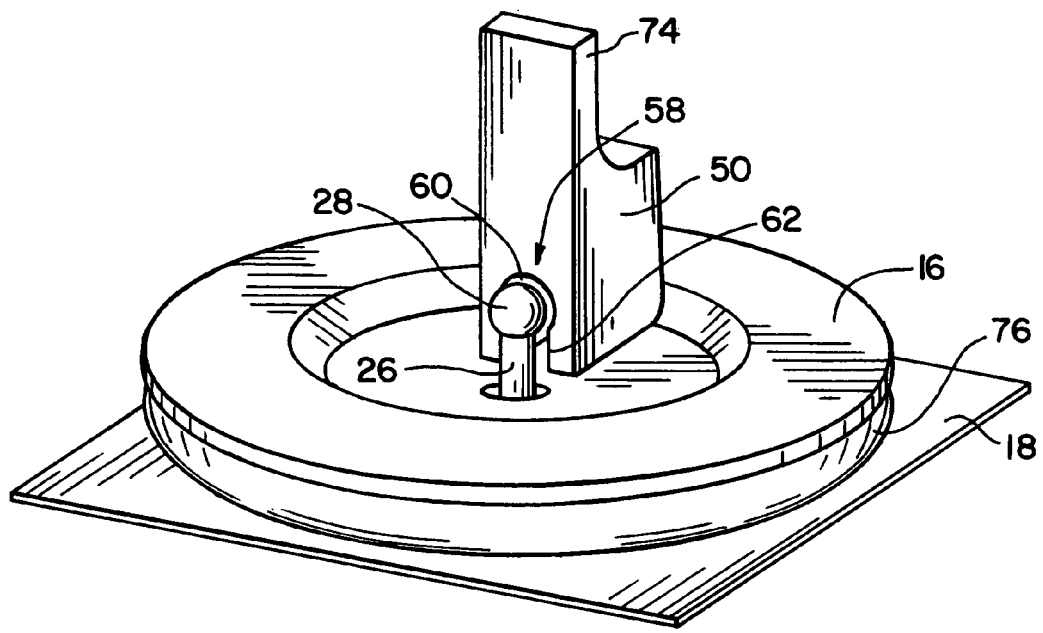
FIG. 7 is a perspective view of the fastener depicting the latch in a position for completing connection to the anchor.

Latch 14 is positioned substantially as shown in FIG. 7, with end face 52 against first object 16 and first adjacent face 54 approaching and confronting a distal end portion of post 26 and enlargement 28. Enlargement 28 and post 26 enter slot 58 as latch 14 is slid forward, with adjacent face 54 sliding past post 16. Latch 14 is slid there along until enlargement 18 confronts restriction 64 in cavity 60. By pressing on handle 74, an installer causes latch 14 to tilt, rotating on curved transitions 70, 72 so that end face 52 is elevated away from first object 16 and second adjacent face 56 is moved toward first object 16. Enlargement 28 is held in cavity 60 by restriction 64 and by the narrowness of channel 62 adjacent cavity 60. Thus, enlargement 28 slides along surfaces of cavity 60 as latch 14 is tilted from the position shown in FIG. 7 to that shown in FIG. 8. Post 26 swings through channel 62 until it projects outwardly from cavity 60 in second adjacent face 56.

Since body 50 is of greater thickness between first face 54 and second face 56 nearer end face 52 than further from end face 52, slightly more than 90° rotation is required along curved transitions 70 and 72. In the affixed position, handle 74 angles downwardly toward first object 16 from end face 52 to the distal end of handle 74.

By providing controlled relative dimensions of channel 62, a compressive force is applied as latch 14 is rotated and secured. To achieve the compressive force, the dimension of channel 62 between cavity 60 and end face 52 is less than the dimension between restriction 64 and second face 56. As latch 14 is moved from having end face 52 against first object 16 to having second adjacent face 56 against first object 16, first object 16 is forced downwardly against flange 36 and/or resilient layer 42. By controlling the dimensions of channel 62, the desired degree of compressive force can be applied. Since body 50 becomes thinner away from end face 52, as latch 14 is moved to the tightened position, second adjacent face 56 snaps against first object 16, indicating the fastener is secured properly. Both visual and audible indications of a completed connection can be provided. The length and position of handle 74 provides a mechanical advantage so that rotation of latch 14 can be completed without the use of tools, even when significant compressive force is applied by the completion of the connection of latch 14 to anchor 12.

First object 16 can be provided with a compressive seal 76 to create a further moisture-tight seal between first object 16 and second object 18, as compressive force is applied by fastener 10. While depicted in the drawings as surrounding fastener 10, seal 76 can be provided at relevant contact points between first object 16 and second object 18. Again, by way of example, when first object 16 is a door module, and second object 18 is a primary door panel, and a plurality of fasteners 10 are used to secure the module to the panel, seal 76 can be provided around the perimeter of the door module.

Variations and modifications of the foregoing are within the scope of the present invention. It is understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention. The claims are to be construed to include alternative embodiments to the extent permitted by the prior art.

Various features of the invention are set forth in the following claims.

What is claimed is:

1. A fastener for securing a first object having a hole therethrough to a second object, said fastener comprising:
    an anchor for attachment to the second object, said anchor including:
        a base configured for attachment to the second object;
        a post projecting from said base, said post being configured for inserting in the hole of the first object; and
        an enlargement on a distal end of said post; and
    a latch configured for selective engagement with and disengagement from said anchor, said latch including a body having an end face and first and second adjacent faces extending away from opposite edges of said end face, said body defining:
        a cavity receiving and holding said enlargement in a first position of said latch, said cavity extending from said first adjacent face to said second adjacent face, wherein said latch configured for moving a second position to secure said post and said enlargement into said latch;
        an opening to said cavity in said first adjacent face, said opening being sufficiently large for said enlargement to enter said cavity;

a restriction in said cavity preventing said enlargement from passing there past to said second adjacent face;

a channel open to said cavity, to said end face and to said first and second adjacent faces, said channel being of sufficient width for said post to pass therethrough and of insufficient width at least adjacent said cavity for said enlargement to enter said channel.

2. The fastener of claim 1, said latch including a handle extending outwardly from said body generally on an end of said body opposite from said end face.

3. The fastener of claim 2, said base including a center elongation and lateral members for securing said anchor relative to a hole in the second object.

4. The fastener of claim 3, said base including a flange larger than the hole in the second object and deflectable members insertable through the hole in the second object and engagable against a surface of the second object opposite another surface of the second object confronting said flange.

5. The fastener of claim 1, said base including a center elongation and lateral memebers for securing said anchor relative to a hole in the second object.

6. The fastener of claim 5, said base including a flange larger than the hole in the second object and deflectable members insertable through the hole in the second object and engagable against a surface of the second object opposite another surface of the second object confronting said flange.

7. The fastener of claim 1, said body having a curved transition from said end face to said second adjacent face.

8. The fastener of claim 7, a thickness of said body between said first and second adjacent faces being greater near said end face, and decreasing away from said end face.

9. The fastener of claim 7, a distance in said cavity from said restriction to said second adjacent face being greater than a length of said channel from said cavity to said end face.

10. The fastener of claim 1, a distance in said cavity from said restriction to said second adjacent face being greater than a length of said channel from said cavity to said end face.

11. A fastener for securing a first object having a hole therethrough to a second object, said fastener comprising:
an anchor connectable to the second object, said anchor including;
a base configured for attachment to the second object;
a post projecting from said base; and
an enlargement on a distal end of said post, said enlargement configured to pass through said hole;
a latch including a body having an end face and first and second faces adjacent opposite edges of said end face; and
a generally keyhole-shaped slot extending into said body between said first face and said second face, said slot including a cavity having an opening in said first face of sufficient size for said enlargement to enter therethrough, said cavity having a restriction therein between said first and second faces for preventing said enlargement from passing there past, said slot including a channel open to said cavity and extending through said body between said first face and said second face and between said cavity and said end face, said channel of sufficient width for said post to move therethrough and sufficiently narrow adjacent said cavity to prevent said enlargement from entering said channel cavity receiving and holding said enlargement in a first position of said latch, said cavity extending from said first adjacent face to said second adjacent face, wherein said latch configured for moving a second position to secure said post and said enlargement into said latch.

12. The fastener of claim 11, said base including a center elongation and lateral members for securing said anchor relative to a hole in the second object.

13. The fastener of claim 12, said base including a flange larger the hole in the second object, and said lateral members being deflectable members insertable though the hole in the second object and engagable against a surface of the second object opposite another surface of the second object confronting said flange.

14. The fastener of claim 13, said latch including a handle extending outwardly from said body on a side of side body opposite said end face.

15. The fastener of claim 11, said latch including a handle extending outwardly from said body on a side of side body opposite said end face.

16. The fastener of claim 11, wherein a distance is defined between said first face and said second face such that said distance decreases as it moves away from said end face.

17. The fastener of claim 11, including a curved transition from said end face to said second face.

18. The fastener of claim 11, a distance in said cavity from said restriction to said second face being greater than a length of said channel from said cavity to said end face.

19. The fastener of claim 11, said anchor including a resilient layer confronting a surface of the first object.

20. A fastener for securing a first object having a hole therethrough to a second object, said fastener comprising:
an anchor connectable to the second object, said anchor including;
a base configured for attachment to the second object;
a post projecting from said base; and
an enlargement on a distal end of said post, said enlargement configured to pass through the hole; and
a latch including a body having a slot receiving and engaging said post and said enlargement in a first position, said slot having an opening for receiving said enlargement, and said slot further having a channel in communication with said opening, said channel being of sufficient width for said post to move therethrough and of insufficient width at least adjacent said opening for said enlargement to move into said channel, said latch being positioned adjacent the first object in said first position thereby defining a first distance between said slot and said first object, said latch configured for tilting to a second position to lock said post and said enlargement into said latch, said latch being positioned adjacent said first object in said second position such that a second distance between said slot and said first object is less than said first distance so as to effectively compress said first and second objects toward each other.

* * * * *